(12) United States Patent
Forrester

(10) Patent No.: US 7,121,995 B2
(45) Date of Patent: Oct. 17, 2006

(54) METHOD FOR STABILIZATION OF LEAD SMELTER SLAG AND MATTE

(76) Inventor: Keith Edward Forrester, 78 Tracy Way, Meredith, NH (US) 03253

( * ) Notice: Subject to any disclaimer, the term of this patent is extended or adjusted under 35 U.S.C. 154(b) by 0 days.

(21) Appl. No.: 11/079,844

(22) Filed: Mar. 14, 2005

(65) Prior Publication Data

US 2005/0215841 A1   Sep. 29, 2005

Related U.S. Application Data

(60) Provisional application No. 60/556,526, filed on Mar. 25, 2004.

(51) Int. Cl.
B09B 1/00 (2006.01)
(52) U.S. Cl. .................... 588/256; 588/412
(58) Field of Classification Search ............... 588/256, 588/412
See application file for complete search history.

(56) References Cited

U.S. PATENT DOCUMENTS

| | | | |
|---|---|---|---|
| 4,356,030 A * | 10/1982 | Halpin et al. ............ 75/629 |
| 4,652,381 A | 3/1987 | Inglis |
| 4,737,356 A | 4/1988 | O'Hara et al. |
| 4,889,640 A | 12/1989 | Stanforth |
| 5,037,479 A | 8/1991 | Stanforth et al. |
| 5,040,920 A | 8/1991 | Forrester |
| 5,202,033 A | 4/1993 | Stanforth et al. |
| 5,245,114 A | 9/1993 | Forrester |
| 5,430,233 A | 7/1995 | Forrester |
| 5,536,899 A | 7/1996 | Forrester |
| 5,722,928 A | 3/1998 | Forrester |
| 5,846,178 A * | 12/1998 | Forrester ............ 588/256 |
| 5,860,908 A | 1/1999 | Forrester |
| 6,186,939 B1 | 2/2001 | Forrester |
| 6,688,811 B1 | 2/2004 | Forrester |
| 2003/0143031 A1 | 7/2003 | Forrester |
| 2004/0006253 A1 | 1/2004 | Forrester |
| 2004/0015036 A1 | 1/2004 | Forrester |
| 2004/0018130 A1 | 1/2004 | Forrester |
| 2004/0024281 A1 | 2/2004 | Forrester |
| 2004/0024283 A1 | 2/2004 | Forrester |
| 2004/0034267 A1 | 2/2004 | Forrester |
| 2004/0068156 A1 | 4/2004 | Forrester |
| 2004/0091549 A1 | 5/2004 | Forrester |
| 2005/0049449 A1 | 3/2005 | Forrester |

FOREIGN PATENT DOCUMENTS

| | | |
|---|---|---|
| GB | 2 277 515 A | 11/1994 |
| WO | WO 98/57710 A1 | 12/1998 |

\* cited by examiner

*Primary Examiner*—John Kreck
(74) *Attorney, Agent, or Firm*—Hamilton, Brook, Smith & Reynolds, P.C.

(57) ABSTRACT

This invention provides a method for stabilization of lead smelter slag and matte subject to acid and water leaching tests or leach conditions by addition of stabilizing agents into the smelter feed such that leaching of lead is inhibited to desired levels. The resultant waste after stabilization is deemed suitable for on-site reuse, off-site reuse or disposal as RCRA non-hazardous waste.

10 Claims, No Drawings

METHOD FOR STABILIZATION OF LEAD SMELTER SLAG AND MATTE

This application claims priority to provisional application 60/556,526 filed on 25 Mar. 2004.

BACKGROUND OF THE INVENTION

Heavy metal bearing smelter slag and matte produced during lead smelting and recovery may be deemed "Hazardous Waste" by the United States Environmental Protection Agency (USEPA) pursuant to 40 C.F.R. Part 261 and also deemed hazardous under similar regulations in other countries such as Japan, Switzerland, Mexico, Australia, Canada, Taiwan, European Countries, India, and China, and deemed special waste within specific regions or states within those countries, if containing designated leachate solution-soluble and/or sub-micron filter-passing particle sized lead (Pb) above levels deemed hazardous by those country, regional or state regulators.

In the United States, any solid waste or contaminated soil can be defined as Hazardous Waste either because it is "listed" in 40 C.F.R., Part 261 Subpart D, federal regulations adopted pursuant to the Resource Conservation and Recovery Act (RCRA), or because it exhibits one or more of the characteristics of a Hazardous Waste as defined in 40 C.F.R. Part 261, Subpart C. The hazard characteristics defined under 40 CFR Part 261 are: (1) ignitability, (2) corrosivity, (3) reactivity, and (4) toxicity as tested under the Toxicity Characteristic Leaching Procedure (TCLP). 40 C.F.R., Part 261.24(a), contains a list of heavy metals and their associated maximum allowable concentrations. If a heavy metal, such as lead, exceeds its maximum allowable concentration from a solid waste, when tested using the TCLP analysis as specified at 40 C.F.R. Part 261 Appendix 2, then the solid waste is classified as RCRA Hazardous Waste. The USEPA TCLP test uses a dilute acetic acid either in de-ionized water (TCLP fluid 2) or in de-ionized water with a sodium hydroxide buffer (TCLP fluid 1). Both extract methods attempt to simulate the leachate character from a decomposing trash landfill in which the solid waste being tested for is assumed to be disposed in and thus subject to rainwater and decomposing organic matter leachate combination . . . or an acetic acid leaching condition. Waste containing leachable heavy metals is currently classified as hazardous waste due to the toxicity characteristic, if the level of TCLP analysis is above 0.2 to 100 milligrams per liter (mg/L) or parts per millions (ppm) for specific heavy metals. The TCLP test is designed to simulate a worst-case leaching situation . . . that is a leaching environment typically found in the interior of an actively degrading municipal landfill. Such landfills normally are slightly acidic with a pH of approximately 5±0.5. Countries outside of the US also use the TCLP test as a measure of leaching such as Thailand, Taiwan, Mexico, and Canada. Thailand also limits solubility of Cu and Zn, as these are metals of concern to Thailand groundwater. Switzerland and Japan regulate management of solid wastes by measuring heavy metals and salts as tested by a sequential leaching method using carbonated water simulating rainwater and de-ionized water sequential testing. Additionally, U.S. EPA land disposal restrictions prohibit the land disposal of solid waste leaching in excess of maximum allowable concentrations upon performance of the TCLP analysis. The land disposal regulations require that hazardous wastes are treated until the heavy metals do not leach at levels from the solid waste at levels above the maximum allowable concentrations prior to placement in a surface impoundment, waste pile, landfill or other land disposal unit as defined in 40 C.F.R. 260.10.

Suitable acetic acid leach tests include the USEPA SW-846 Manual described Toxicity Characteristic Leaching Procedure (TCLP) and Extraction Procedure Toxicity Test (EP Tox) now used in Canada. Briefly, in a TCLP test, 100 grams of waste are tumbled with 2000 ml of dilute and buffered or non-buffered acetic acid for 18 hours and then filtered through a 0.75 micron filter prior to nitric acid digestion and final ICP analyses for total "soluble" metals. The extract solution is made up from 5.7 ml of glacial acetic acid and 64.3 ml of 1.0 normal sodium hydroxide up to 1000 ml dilution with reagent water.

Suitable water leach tests include the Japanese leach test which tumbles 50 grams of composited waste sample in 500 ml of water for 6 hours held at pH 5.8 to 6.3, followed by centrifuge and 0.45 micron filtration prior to analyses. Another suitable distilled water $CO_2$ saturated method is the Swiss protocol using 100 grams of cemented waste at 1 $cm^3$ in two (2) sequential water baths of 2000 ml. The concentration of lead and salts are measured for each bath and averaged together before comparison to the Swiss criteria.

Suitable citric acid leach tests include the California Waste Extraction Test (WET), which is described in Title 22, Section 66700, "Environmental Health" of the California Health & Safety Code. Briefly, in a WET test, 50 grams of waste are tumbled in a 1000 ml tumbler with 500 grams of sodium citrate solution for a period of 48 hours. The concentration of leached lead is then analyzed by Inductively-Coupled Plasma (ICP) after filtration of a 100 ml aliquot from the tumbler through a 45 micron glass bead filter.

The present invention provides a method of reducing the solubility of Pb slag and matte in an in-furnace manner. Pb is controlled by the invention under TCLP, SPLP, CALWET, MEP, rainwater and surface water leaching conditions as well as under regulatory water extraction test conditions as defined by waste control regulations in Thailand, Taiwan, Japan, Canada, Mexico, Switzerland, Germany, Sweden, The Netherlands and under American Nuclear Standards for sequential leaching of wastes by de-ionized water. Unlike the present invention, prior art has focused on reducing solubility of Pb outside of the smelter furnace after slag and matte production. These previous methods fail to benefit from in-line Pb stabilization thus avoiding costs of waste handling, permitting, monitoring and stabilization post-slag and matte generation.

U.S. Pat. No. 5,202,033 describes an in-situ method for decreasing Pb TCLP leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of TCLP Pb such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture from treating TCLP hazardous lead by mixing the solid waste with an agent selected from the group consisting of reactive calcium carbonate, reactive magnesium carbonate and reactive calcium magnesium carbonate.

U.S. Pat. No. 4,652,381 discloses a process for treating industrial wastewater contaminated with battery plant waste, such as sulfuric acid and heavy metals by treating the waste waster with calcium carbonate, calcium sulfate, calcium hydroxide to complete a separation of the heavy metals. However, this is not for use in a solid waste situation.

SUMMARY OF THE INVENTION

The present invention discloses a Pb smelter slag and matte stabilization method through contact of slag and matte during furnace production with stabilizing and sub-micron particle agglomeration agents including Portland Cement, cement kiln dust, lime kiln dust, polymers, lime, magnesium, magnesium oxides, dolomitic lime, ferrous sulfate, ferric chloride, alum, coagulants, flocculants, sulfides, sulfates, phosphates, iron, chlorides, silicates, and combinations thereof which are properly chosen to complement the lead recovery and lead bearing slag and matte production.

It is anticipated that the stabilizer and agglomeration agents can be used for both reactive compliance and remedial actions as well as proactive leaching reduction means such that generated waste slag and matte does not exceed hazardous waste criteria. The preferred method of application of stabilizer and agglomeration agents would be in-line within the smelter, and thus allowed under USEPA regulations (RCRA) as totally enclosed, in-tank or exempt method of TCLP stabilization without the need for a RCRA Part B hazardous waste treatment and storage facility permit.

DETAILED DESCRIPTION

Environmental regulations throughout the world such as those developed by the USEPA under RCRA and CERCLA require heavy metal bearing waste, contaminated soils and material producers to manage such materials and wastes in a manner safe to the environment and protective of human health. In response to these regulations, environmental engineers and scientists have developed numerous means to control heavy metals, mostly through chemical applications which convert the solubility of the material and waste character to a less soluble form, thus passing leach tests and allowing the wastes to be either reused on-site or disposed at local landfills without further and more expensive control means such as hazardous waste disposal landfills or facilities designed to provide metals stabilization. The primary focus of scientists has been on reducing solubility of heavy metals such as lead, cadmium, chromium, arsenic and mercury, as these were and continue to be the most significant mass of metals contamination in soils. Materials such as paints, and cleanup site wastes such as battery acids and slag wastes from smelters are major lead sources.

There exists a demand for improved and less costly control methods of lead from smelter slag and matte, that allows for in-furnace Pb stabilization thus reducing expensive post-furnace slag handling, permitting, monitoring, crushing and stabilization application. The present invention discloses an in-line Pb smelter slag and matte control method through contact of waste with stabilizing agents and agglomeration agents including Portland Cement, cement kiln dust, lime kiln dust, polymers, lime, magnesium, magnesium oxides, dolomitic lime, ferrous sulfate, ferric chloride, alum, coagulants, flocculants, sulfides, sulfates, phosphates, iron, chlorides, silicates, and combinations thereof.

It is anticipated that the stabilizers can be used for RCRA compliance actions such that generated waste does not exceed appropriate TCLP hazardous waste criteria, and under TCLP or CERCLA (Superfund) response where stabilizers are added to waste piles or storage vessels previously generated. The preferred method of application of stabilizers would be in-line within the furnace generating the waste, and thus allowed under RCRA as a totally enclosed, in-tank or exempt method of TCLP stabilization without the need for a RCRA Part B hazardous waste treatment and storage facility permit(s).

The stabilizing agents including Portland Cement, cement kiln dust, lime kiln dust, polymers, lime, magnesium, magnesium oxides, dolomitic lime, ferrous sulfate, ferric chloride, alum, coagulants, flocculants, sulfides, sulfates, phosphates, iron, chlorides, silicates, and combinations thereof, with the phosphate group including but not limited to wet process amber phosphoric acid, wet process green phosphoric acid, aluminum finishing Coproduct blends of phosphoric acid and sulfuric acid, technical grade phosphoric acid, monoammonia phosphate (MAP), diammonium phosphate (DAP), single superphosphate (SSP), triple superphosphate (TSP), hexametaphosphate (HMP), tetrapotassium polyphosphate, dicalcium phosphate, tricalcium phosphate, monocalcium phosphate, phosphate rock, pulverized forms of all above dry phosphates, and combinations thereof would be selected through laboratory treatability and/or bench scale testing to provide sufficient control of metals solubility and particle transport potential. In certain cases, such as with the use of amber and green phosphoric acid acid, phosphates may embody sulfuric acid, vanadium, iron, aluminum and other complexing agents which could also provide for a single-step formation of complexed heavy metal minerals. The stabilizer and agglomeration agent type, size, dose rate, contact duration, and application means would be engineered for each type of lead smelter.

Although the exact stabilization formation molecule(s) are undetermined at this time, it is expected that when lead comes into contact with the stabilizing and agglomeration agents in the presence of molten slag and matte and sufficient reaction time and energy, low TCLP/water soluble compounds form such as a mineral phosphate, twinned mineral, mononuclear silicate layers or precipitate through substitution or surface bonding, which is less soluble than the heavy metal element or molecule originally in the material or waste.

Examples of suitable stabilizing agents include, but are not limited to Portland cement, alum, sulfates, sulfides, ferric chloride, phosphate fertilizers, phosphate rock, pulverized phosphate rock, calcium orthophosphates, monocalcium phosphate, dicalcium phosphate, tricalcium phosphate, trisodium phosphates, calcium oxide (quicklime), dolomitic quicklime, silicates, sodium silicates, potassium silicates, natural phosphates, phosphoric acids, wet process green phosphoric acid, wet process amber phosphoric acid, black phosphoric acid, merchant grade phosphoric acid, aluminum finishing phosphoric and sulfuric acid solution, hypophosphoric acid, metaphosphoric acid, hexametaphosphate, tertrapotassium polyphosphate, polyphosphates, trisodium phosphates, pyrophosphoric acid, fishbone phosphate, animal bone phosphate, herring meal, bone meal, phosphorites, and combinations thereof. Salts of phosphoric acid can be used and are preferably alkali metal salts such as, but not limited to, trisodium phosphate, dicalcium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

The amounts of stabilizing agent used, according to the method of invention, depend on various factors including desired solubility reduction potential, desired mineral toxicity, and desired mineral formation relating to toxicological and site environmental control objectives. It has been found that addition of 20% triple superphosphate by weight of lead feed to smelter lead feed was sufficient for initial TCLP Pb stabilization of the batch slag and matte to less than RCRA 5.0 ppm limit. However, the foregoing is not intended to preclude yet higher or lower usage of stabilizing or agglomeration agent or combinations.

The examples below are merely illustrative of this invention and are not intended to limit it thereby in any way.

EXAMPLE

Recycled lead cores from batteries and standard slag and matte smelting additives were combined with 20% (by weight lead) triple superphosphate (0-45-0) at a secondary lead smelter in Tijuana, Mexico. The batch slag and matte was removed from the batch lead rotary smelting unit and allowed to cool prior to sample collection and TCLP analyses.

TABLE 1

| Stabilizer Addition | TCLP Pb (ppm) | TCLP Limit (ppm) |
| --- | --- | --- |
| Baseline | 124.00 | 5.0 |
| 50% TSP | <0.05 | 5.0 |

The foregoing results in Example 1 readily established the operability of the present process to stabilize lead smelter slag and matte thus reducing leachability and bioavailability. Given the effectiveness of the stabilizing agent in causing lead to stabilize as presented in the Table 1, it is believed that an amount of the agents equivalent to less than 50% by weight of lead batch should be effective.

While this invention has been particularly shown and described with reference to preferred embodiments thereof, it will be understood by those skilled in the art that various changes in form and details may be made therein without departing from the spirit and scope of the invention as defined by the appended claims.

I claim:

1. A method of reducing the solubility of lead contained in slag and matte, formed from recycled lead cores of batteries, during furnace production, comprising adding at least one phosphate stabilizing agent into a secondary lead smelter furnace that contains the recycled lead cores from batteries, to produce slag and matte having reduced leaching of lead to a level no more than non-hazardous levels, as determined by an EPA TCLP test, as set forth in the Federal Register, vol. 55, no. 126, pp. 26985–26998 (Jun. 29, 1990).

2. The method of claim 1, wherein the phosphate stabilizing agent is selected from the group consisting of wet process amber phosphoric acid, wet process green phosphoric acid, coproduct phosphoric acid solution from aluminum polishing, technical grade phosphoric acid, hexametaphosphate, polyphosphate, calcium orthophosphate, superphosphates, triple superphosphates, phosphate fertilizers, phosphate rock, tetrapotassium polyphosphate, monocalcium phosphate, monoammonia phosphate, diammonium phosphate, dicalcium phosphate, tricalcium phosphate, trisodium phosphate and salts of phosphoric acid.

3. The method of claim 1, wherein the phosphate stabilizing agent is added to the furnace in an amount of less than about 50% by weight of feed of the recycled lead cores of batteries.

4. The method of claim 2, wherein the phosphate stabilizing agent includes triple superphosphate.

5. The method of claim 4, wherein triple superphosphate is added to the furnace in an amount of about 20% by weight of feed of the recycled lead cores of batteries.

6. A method of reducing the solubility of lead contained in slag and matte, formed from recycled lead cores of batteries, during furnace production, comprising adding at least one phosphate stabilizing agent into a secondary lead smelter that contains the recycled lead cores from batteries, to produce slag and matte having reduced leaching of lead to a level no more than non-hazardous levels as determined under leach tests required by regulation in countries other than the USA including but not limited to Switzerland, Mexico, Taiwan, Japan, Thailand, China, Canada, Germany.

7. The method of claim 6, wherein the phosphate stabilizing agent is selected from the group consisting of wet process amber phosphoric acid, wet process green phosphoric acid, coproduct phosphoric acid solution from aluminum polishing, technical grade phosphoric acid, hexametaphosphate, polyphosphate, calcium orthophosphate, superphosphates, triple superphosphates, phosphate fertilizers, phosphate rock, tetrapotassium polyphosphate, monocalcium phosphate, monoammonia phosphate, diammonium phosphate, dicalcium phosphate, tricalcium phosphate, trisodium phosphate and salts of phosphoric acid.

8. The method of claim 6, wherein the phosphate stabilizing agent is added to the furnace in an amount of less than about 50% by weight of feed of the recycled lead cores of batteries.

9. The method of claim 7, wherein the phosphate stabilizing agent includes triple super phosphate.

10. The method of claim 9, wherein triple super phosphate is added to the furnace in an amount of about 20% by weight of feed of the recycled lead cores of batteries.

* * * * *